（12）United States Patent
Gray et al.

(10) Patent No.: US 9,447,307 B2
(45) Date of Patent: *Sep. 20, 2016

(54) EXTENDABLE SELF-SUPPORTING MATERIAL

(71) Applicant: Liberman Distributing and Manufacturing Co., Saint Paul, MN (US)

(72) Inventors: David A. Gray, Saint Paul, MN (US); Robert M. Hume, Woodbury, MN (US)

(73) Assignee: Liberman Distributing and Manufacturing Co., Saint Paul, MN (US)

( * ) Notice: Subject to any disclaimer, the term of this patent is extended or adjusted under 35 U.S.C. 154(b) by 240 days.

This patent is subject to a terminal disclaimer.

(21) Appl. No.: 14/253,718

(22) Filed: Apr. 15, 2014

(65) Prior Publication Data
US 2014/0227490 A1    Aug. 14, 2014

Related U.S. Application Data

(63) Continuation of application No. 12/471,121, filed on May 22, 2009, now Pat. No. 9,376,600.

(60) Provisional application No. 61/076,227, filed on Jun. 27, 2008.

(51) Int. Cl.
*C09J 9/00* (2006.01)
*C09J 7/02* (2006.01)
(Continued)

(52) U.S. Cl.
CPC ............... *C09J 7/0296* (2013.01); *B32B 3/00* (2013.01); *B32B 7/12* (2013.01); *B32B 27/08* (2013.01); *B32B 27/10* (2013.01); *B32B 27/12* (2013.01); *B32B 27/30* (2013.01); *B32B 27/304* (2013.01); *B32B 27/32* (2013.01); *B32B 27/36* (2013.01); *B32B 27/365* (2013.01); *C09J 7/04* (2013.01); *B05B 15/0456* (2013.01);
(Continued)

(58) Field of Classification Search
None
See application file for complete search history.

(56) References Cited

U.S. PATENT DOCUMENTS 2,990,081 A    6/1961   De Neui et al.
3,073,544 A    1/1963   Cirves et al.
(Continued)

FOREIGN PATENT DOCUMENTS

EP    1921120 A1    5/2008
EP    1928018 A2    6/2008
(Continued)

OTHER PUBLICATIONS

Oxford English Dictionary definition of "Arc", available at http://www.oed.com/view/Entry/10245 (accessed Jul. 20, 2016).*
(Continued)

*Primary Examiner* — Scott R Walshon
(74) *Attorney, Agent, or Firm* — Knowles IP Strategies, LLC; Brett R. Bellows

(57) ABSTRACT

Extendable self-supporting materials, for example, adhesive tapes, papers, and adhesive sheets, and the manufacture of adhesive tapes and papers, wherein a length of tape or other material extends rigidly a certain distance and does not coil or curl onto itself, or curl or coil prematurely onto the receiving substrate. Yet, the material maintains flexibility to be pliable and generally to conform to a surface to which it may be applied. The material is available in sheet form or as rolled goods.

29 Claims, 12 Drawing Sheets

(51) Int. Cl.
  *B32B 7/12* (2006.01)
  *B32B 3/00* (2006.01)
  *C09J 7/04* (2006.01)
  *B32B 27/08* (2006.01)
  *B32B 27/10* (2006.01)
  *B32B 27/12* (2006.01)
  *B32B 27/30* (2006.01)
  *B32B 27/32* (2006.01)
  *B32B 27/36* (2006.01)
  *B05B 15/04* (2006.01)

(52) U.S. Cl.
  CPC ....... *B32B 2255/10* (2013.01); *B32B 2255/26* (2013.01); *B32B 2262/04* (2013.01); *B32B 2307/54* (2013.01); *B32B 2307/736* (2013.01); *B32B 2405/00* (2013.01); *B32B 2535/00* (2013.01); *Y10T 428/24314* (2015.01); *Y10T 428/24628* (2015.01); *Y10T 428/266* (2015.01); *Y10T 428/2839* (2015.01); *Y10T 428/2848* (2015.01)

(56) References Cited

U.S. PATENT DOCUMENTS

| | | |
|---|---|---|
| 3,109,207 A | 11/1963 | Cooper |
| 3,132,204 A | 5/1964 | Giellerup |
| 3,409,988 A | 11/1968 | Zelnick |
| 3,510,037 A | 5/1970 | Sharpe |
| 3,718,495 A | 2/1973 | Tomita |
| 4,149,320 A | 4/1979 | Troyer et al. |
| 4,256,528 A | 3/1981 | Patterson |
| 4,313,991 A | 2/1982 | Lamb |
| 4,315,047 A | 2/1982 | Seabold et al. |
| 4,341,585 A | 7/1982 | Seabold et al. |
| 5,005,264 A | 4/1991 | Breen |
| 5,154,956 A * | 10/1992 | Fradrich ............ G09F 3/10 283/81 |
| 5,223,315 A * | 6/1993 | Katsura ............ B29C 49/24 156/232 |
| 5,314,749 A | 5/1994 | Shah |
| 5,518,763 A | 5/1996 | Patnode et al. |
| 5,605,738 A | 2/1997 | McGinness et al. |
| 5,725,947 A | 3/1998 | Johannsen et al. |
| 5,859,116 A | 1/1999 | Shih |
| 5,953,826 A | 9/1999 | Goodyer et al. |
| 6,001,200 A | 12/1999 | Hibler |
| 6,067,722 A | 5/2000 | Goodyer et al. |
| 6,256,938 B1 | 7/2001 | Daton-Lovett |
| 6,372,341 B1 | 4/2002 | Jung et al. |
| 6,395,348 B1 | 5/2002 | O'Connor |
| 6,602,574 B1 | 8/2003 | Daton-Lovett |
| 6,680,097 B1 | 1/2004 | Amberger et al. |
| 6,740,379 B1 | 5/2004 | Congard et al. |
| 7,107,698 B2 | 9/2006 | Liao |
| 2001/0019764 A1 | 9/2001 | Bries et al. |
| 2002/0050318 A1 | 5/2002 | Donaldson et al. |
| 2003/0182878 A1 | 10/2003 | Warren |
| 2003/0230379 A1 | 12/2003 | Roubik |
| 2005/0003222 A1 | 1/2005 | Everaerts et al. |
| 2005/0011665 A1 | 1/2005 | Youngers et al. |
| 2005/0074606 A1 | 4/2005 | Nishiyama et al. |
| 2007/0172684 A1 | 7/2007 | Husemann et al. |
| 2008/0058858 A1 | 3/2008 | Smith |
| 2008/0131634 A1 | 6/2008 | Kiuchi et al. |
| 2008/0233320 A1 | 9/2008 | Fink et al. |
| 2009/0016209 A1 | 1/2009 | Ikeda et al. |
| 2009/0297820 A1 * | 12/2009 | Kovalchuk ......... B29C 55/023 428/304.4 |
| 2009/0324883 A1 | 12/2009 | Gray et al. |

FOREIGN PATENT DOCUMENTS

| | | | |
|---|---|---|---|
| EP | 2127852 A1 * | 12/2009 | .......... B29C 55/023 |
| EP | 1866895 | 5/2010 | |
| GB | WO 0012288 A1 * | 3/2000 | ............... G09F 3/04 |
| GB | 2363204 A | 12/2001 | |
| JP | H07-137190 A | 5/1995 | |
| JP | 2005-061212 | 3/2005 | |
| JP | 2006-168005 A | 6/2006 | |
| WO | WO 01/56777 | 8/2001 | |
| WO | 2005061642 A1 | 7/2005 | |
| WO | WO 2007/056715 A2 | 5/2007 | |
| WO | 2009158234 A2 | 12/2009 | |
| WO | 2010026163 A1 | 3/2010 | |

OTHER PUBLICATIONS

"Fascinating Silicone Chemistry Corner Physical & Chemical Properties", obtained Aug. 13, 2011, Dow Corning, http://www.dowcorning.com/content/discover/discoverchem/properties.aspx.

"Si—Silicon", obtained Aug. 13, 2011, Ioffe Physical Technical Institute, http://www.ioffe.rssi.ru/SVA/NSM/Semicond/Si/mechanic.html.

Satas, Donatas. "Handbook of Pressure Sensitive Adhesive Technology" 3rd ed., Warwick, RI: Satas & Associates, 1999, pp. 515-549.

Final Rejection mailed Jul. 13, 2016 from U.S. Appl. No. 14/752,251.

Kebadze, et al., "Bistable prestressed shell structures" International Journal of Solids and Structures, vol. 41, 2004, pp. 2801-2820.

Mattioni et al., "The application of residual stress tailoring of snap-through composites for variable sweep wings" 47th AIAA/ASME/ASCE/AHS/ASC Structures, Structural Dynamics, and Materials Conference May 1-4, 2006, Newport, Rhode Island.

Supplementary European Search Report and Opinion from EP09771242.6. (reported dated Jul. 3, 2015).

* cited by examiner

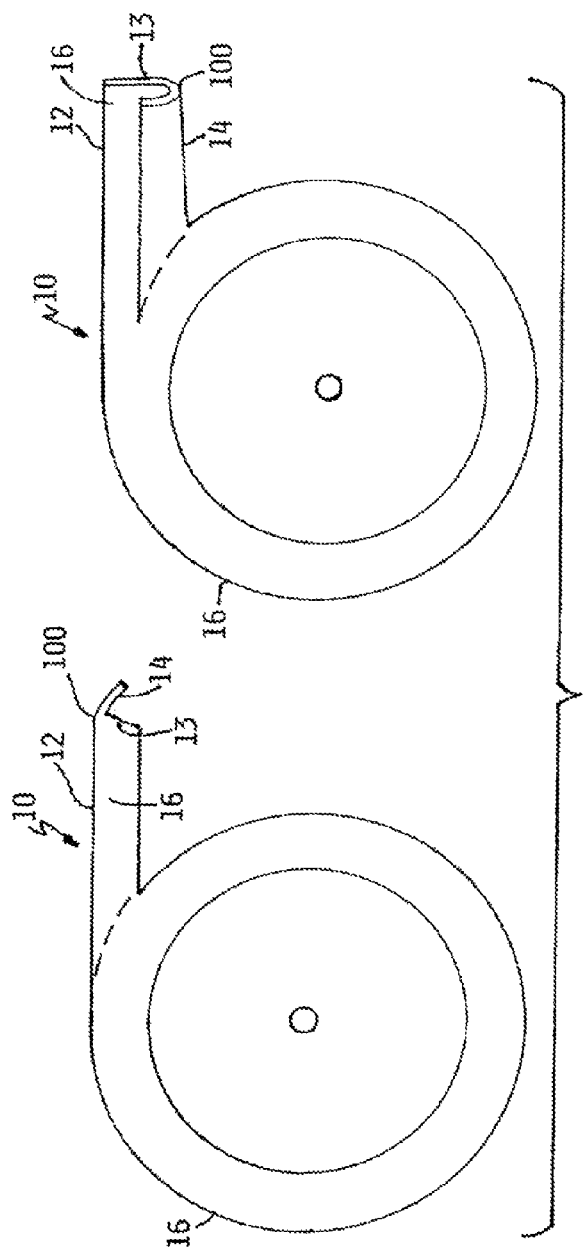
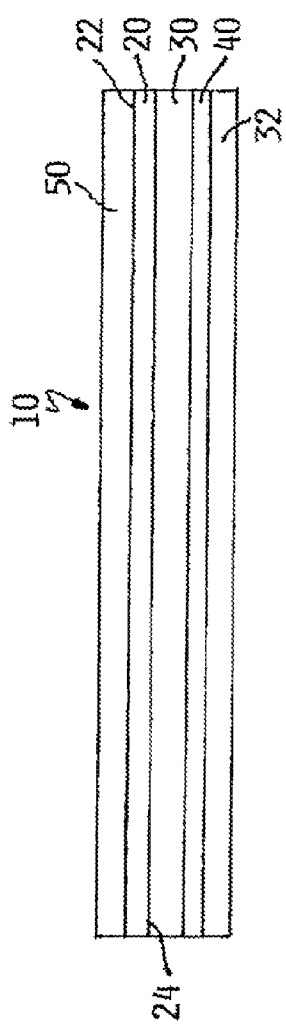
FIG. 1
FIG. 2

| Material | Young's Modulus (GPa) | Young's Modulus (psi) | Yield Strength (MPa) | Ultimate Strength (MPa) | Density (g/cm$^3$) |
|---|---|---|---|---|---|
| Low Density Polyethylene | 0.2 | 30,000 | — | — | — |
| Polypropylene | 1.5 – 2 | 217,000 – 290,000 | 12 – 43 | 19.7 – 80 | 0.91 |
| HDPE | 1.379 | 200,000 | 26 – 33 | 37 | 0.95 |
| Polyethylene terephthalate | 2 – 2.5 or 2.8 – 3.1 | 290,000 – 360,000 | — | — | — |
| Polystyrene | 3 – 3.5 | 435,000 – 505,000 | — | — | — |

FIG. 10

EXTENDABLE SELF-SUPPORTING MATERIAL

STATEMENT OF RELATED APPLICATIONS

This application is a continuation of U.S. application Ser. No. 12/471,121 filed May 22, 2009, which is related to and claims the benefit of U.S. Provisional Patent Application No. 61/076,227 filed Jun. 27, 2008. The entirety of each of these applications is hereby incorporated by reference for all purposes.

BACKGROUND OF THE INVENTION

Adhesive tapes generally comprise at least a backing material and an adhesive, wherein the adhesive is generally a pressure sensitive adhesive. The pressure sensitive adhesive can be a permanent pressure sensitive adhesive, where once the adhesive surface of the tape is applied to a substrate the tape cannot be peeled away from the substrate surface without damaging the tape or the substrate surface. Alternatively, the pressure sensitive adhesive can be a removable pressure sensitive adhesive, where once the adhesive surface of the tape is applied to a substrate the tape can be removed cleanly from the substrate surface without damaging the tape or the substrate surface. The strength of the adhesive bond is variable along a continuum, from a permanent pressure sensitive adhesive to a very light tack removable or easily released pressure sensitive adhesive, such as used in masking tape. The performance of the pressure sensitive adhesive bond will also vary dependent upon the substrate to which it is adhered; for example such as the difference between adhering to a hard, smooth surface or a soft, fibrous surface. Generally, the backing material is present in a long strip, and the backing material is ultimately attached to some other surface or substrate, through the pressure sensitive adhesive. This attachment may be permanent, as in a sealing tape, or temporary, as in a surgical tape, a masking tape or painter's tape.

The backing used to compose a pressure sensitive adhesive tape and materials can be made of a variety of materials, such as cloth, paper, films, foils, various laminates, and can include strand reinforcement in the backing material. Film-backed tapes are very prevalent and are well-known by consumers. The film backing material can be selected from a group including cellophane, polyester, polyethylene, polypropylene, polyvinyl chloride and cellulose acetate films. Consumers are well aware of and commonly use film-backed pressure sensitive adhesive tapes, where finger pressure is sufficient to activate the adhesive, for sealing gift wrapping on presents, mending tears in paper, bandaging medical wounds, sealing boxes, and the like. Generally, the film is transparent, so that any writing or pattern is still visible underneath the tape. Often, the backside of the film backing is coated with a release coating to reduce the adhesion of the adhesive to the backside of the next layer of tape, when the tape is provided in roll form. Further, cloth backings can be used with pressure sensitive adhesives to form strong tapes and materials with colored backing, such as surgical tape and duct tape. These types of tapes are often used for bandaging medical wounds, and for structural/sealing purposes. Segments of these types of tapes can be easily cut or torn off the roll of tape. The cloth backing can be coated to improve appearance, unwind characteristics and to improve adhesion of the pressure sensitive adhesive to the cloth backing.

Paper backing can also be used as a backing for pressure sensitive adhesive tape and materials. Here, too, the paper backing can be coated or impregnated with a material to strengthen the backing. Additionally, a release coating can be applied to the back of the paper backing, to reduce adhesion of the tape to itself; to reduce the unwind tension of the tape. Paper backing can also be used for decal tapes. These decal tapes are generally applied to release papers or develop no adhesion to the backing when in roll form. Further, paper backing can also be used for decal sheets and graphic art panels.

Pressure sensitive tapes can be used for various applications, in the home and in industry. As noted above, perhaps the best known product is the film or cellophane coated pressure sensitive tape used for sealing packages, wrapping gifts, repairing paper tears, and so on. Further, similar tapes are used in the packaging industry for sealing boxes and cartons containing products that require protection during shipment. Easily removable pressure sensitive tapes are used for masking surfaces which are to be painted. These masking tapes may be used, for example, in the automobile industry to mask areas of the automobile that are not to be painted and, for large surfaces which are to be protected, may be used to hold up masking paper. Painters often use masking tape to mask wall and ceiling edges so that the adjacent surface is protected and does not get painted, inadvertently. Further, tapes can be used for decorative stenciling of designs and/or names. The stencils can be positioned well before actual painting is required, and the stencil is easily removable after painting is completed.

Often, the pressure sensitive adhesive tape is provided in a roll form. The tape may have a width as small as a quarter inch, or smaller; or a width up to several inches, or even feet, dependent upon the use of the tape. Irrespective of the width of the tape, it is a common experience when using a roll of pressure sensitive tape to pull out a length of tape and find that the tape coils or curls upon itself. Often, this results in the adhesive side of the tape sticking to itself or sticking prematurely to the substrate for which it was intended, thus making the tape unusable and requiring a replacement length of tape, causing scrap, waste, and lost time. Equally important, the misapplied tape can cause damage to the material to which it was misapplied, for example, a car body waiting to be painted. Alternatively, time may be taken to disentangle the tape so that the tape could still be used, but this also results in lost time. In the home and office environments, these types of problems can slow down work and be annoying. In the industrial/business environment, these types of problems can result in potentially expensive work stoppages, especially if the pressure sensitive adhesive comes into contact with equipment and fouls the equipment, such that the equipment must be cleaned from adhesive before work can be resumed. Ultimately, the misapplied materials and mishandled materials can cause added expense to the final product.

Sheets containing a coating, for example, a pressure sensitive adhesive on a surface can be used as graphic arts panels, decal sheets, stencils, and the like. Here, too, work may be stopped, and replacement sheets may potentially be required if the pressure sensitive sheet folds and adheres to itself or to an undesired surface, and cannot be removed without affecting the sheet or substrate. Further, if the product is a graphic panel, for example, the graphics used on a city bus or ambulance, then undesired contact of the surfaces of the panels may cause the panels to be unusable and add expense to the process or the product. Further, due to the bending of large sheets, more than one person may be required to mount a large decal, art panel, or other sheet to prevent the sheet from folding on itself.

Hence, there is a need for pressure sensitive tapes, coated tapes, coated sheets, and sheets and papers that can be manipulated without being subject to the problems noted above.

SUMMARY OF THE INVENTION

The various embodiments of the disclosure are directed to a sheet material or tape, for example, a pressure sensitive tape or material, constructed so that when a length of the tape or material is pulled from a roll configuration, the tape or material extends beyond the end of the roll without curling or coiling upon itself, and exhibits a certain amount of rigidity as the tape extends beyond the edge of the roll of tape and is self-supporting. The tape or sheet extends similarly to a metal tape measure, as described in U.S. Pat. No. 7,107,698 to Huei-Yen Liao, which is incorporated by reference. Furthermore, the disclosure is directed to a sheet or panel of material, wherein the sheet or panel can be lifted, or removed from a pad or stack, and the sheet or panel exhibits a certain amount of rigidity so that the sheet or panel is self-supporting. The sheet or panel can be coated or contain no coating. The ingredients and components comprising the tape, panels and sheets cooperate to impart a certain curvature to the tape, panel or sheet, to form an extendable product that still remains flexible.

In one embodiment, the pressure sensitive tape exhibits an extendability or rigidity beyond the edge of the roll of tape as the result of the composition of the tape cooperating with a layer of shrink film in the tape material, which has been activated to instill a certain curvature to the tape. This longitudinal curvature facilitates extension of a length of tape well beyond the edge of the roll of tape, without the tape coiling or curling prematurely upon itself. The length of pressure sensitive tape holds its shape, yet remains flexible, and can be affixed to a surface with varying degrees of pressure. In a related embodiment, a shrink film can be laminated or otherwise joined to plastic netting to impart the desired curvature to a tape or sheet.

In particular, a length of pressure sensitive tape or material of the invention can be securely applied to a surface by positioning the end/edge of the tape on the surface, where the surface is some distance away, and applying pressure along the length of the tape or material, while the tape or material maintains a straight line projection. The material or tape does not coil, curl or fall. For example, a length of pressure sensitive masking tape can be affixed to the upper corner of a wall without having to climb a ladder to be able to reach the wall/ceiling corner to place the masking tape by hand. A masking tape of the invention extends from the edge of the roll of masking tape such that climbing a ladder to reach the wall/ceiling corner is not necessary. The masking tape is rigid enough to reach the wall/ceiling corner from below and pressure from a long-handled tool can affix the masking tape in place. In another example, a length of cellophane pressure sensitive tape can be pulled from a tape dispenser, to seal a seam of wrapping paper on a package, or the seam of a box. The pressure sensitive cellophane tape extends from the dispenser, and is rigid enough to substantially maintain a line projection (and not curl, fall or coil), and the length can be applied to the package with finger pressure. The length of cellophane tape can be cut by a sharp edge of the dispenser or with a sharp implement, for example, a pair of scissors or serrated blade.

In some embodiments, the backing material of the pressure sensitive tape is creped prior to coating the backing with pressure sensitive adhesive. The non-adhesive coated backing side can be coated with a release agent. The pressure sensitive adhesive is coated onto the creped backing and wound into a roll. When the pressure sensitive tape is dispensed, the tape is rigid due to factors among which is the nature of the backing and the shape imparted to the tape, and the tape can extend from the roll edge a certain length and maintain its shape, and not curl, coil or fall on itself. The backing can be selected from materials such as paper, vinyl, polypropylene, polyethylene, polyethylene terephthalate, polycarbonate, and other such plastic films, cloth, and the like. Other configurations for the backing material are contemplated, as well as other materials such as cellulose nanofibrils.

In a related embodiment, the backing of a sheet or panel is creped prior to coating the backing. The coating can be an adhesive coating or other type of coating. The coating is coated onto the creped backing and wound into a roll, or left as flat sheets or panels. The sheet or panel is rigid due to the nature of the backing and composition of the panel, and can be self-supporting and maintain its shape, and not fall on itself. The backing can be selected from materials such as paper, vinyl, polypropylene, polyethylene, polyethylene terephthalate, polycarbonate, and other such plastic films, cloth, and the like.

Some embodiments include a multiple-ply film laminate coated with pressure sensitive adhesive to form the pressure sensitive adhesive tape. In this embodiment, the film laminate provides the self-supporting structure that imparts the rigidity to the tape. However, the tape can still be formed in a roll. Here, too, the pressure sensitive tape extends from the edge of the tape roll without curling or coiling on itself, or kinking/hinging prematurely. The multi-ply laminate can also take the form of sheets or panels and, optionally, can include a coating, for example, an adhesive coating. The composition and shape of the multiple-ply laminate sheet or panel provides a certain rigidity to the sheet or panel so that the panel does not curl or fall prematurely.

In a further embodiment of the invention, a surface of a film backing is coated with a pressure sensitive adhesive, and the opposite surface may be coated with a release agent. The coated film is passed over a heating element, such as a heated roller, and curvature is imparted to the film. The pressure sensitive adhesive coated film, e.g. pressure sensitive tape, can be wound into a roll form, and the tape will lay flat. However, when the pressure sensitive tape end is pulled from the roll, the film backing retains its curvature, thus forming a curved and rigidly extending tape length. Heat is used to set the curvature in the film, thus forming a rigid, but flexible pressure sensitive tape. A similar process can be used to impart curvature to an uncoated tape, a sheet or panel, wherein the sheet or panel can, optionally, include a coating. The sheet or panel, in roll form or in sheet or panel form, is passed over a heating element and curvature is imparted to the sheet or panel. Hence, the roll material can be cut into sheets and panels that retain the curvature and are self-supporting, or the sheet and panel forms initially produced also are self-supporting.

In another aspect of the invention, panels or sheets of material are designed so that the components of the sheet or panel cooperate to impart a certain curvature to the sheet or panel, so that the sheet or panel has a certain extendability or rigidity, resulting in the sheet or panel being generally self-supporting. The sheets or panels can include a coating, including an adhesive coating. These sheets and panels can be individual sheets and panels or can be formed in a pad. The sheets and panels can be used, for example, as graphic panels (e.g. vinyl graphic panels) that are affixed to other surfaces, such as airplanes, buses, trucks, and other vehicles. The sheets and panels are extendable, rigid, yet flexible.

In another embodiment demonstrating the instant invention, an annular ring of film is extruded from a die, thus making a tubular shape. The film tube is split and, optionally, a surface of the split tube is coated with pressure sensitive adhesive. Preferably, the exterior surface of the tube is coated with pressure sensitive adhesive, to form the pressure sensitive tape. The curvature imparted to the tape is based upon the mass of the film.

In another aspect of the disclosure, a hot melt pressure sensitive adhesive is coated on a backing material. The temperature of the hot melt adhesive at application, and the cooling regime for the combined adhesive and backing, results in the induced curvature of the pressure sensitive tape formed by the hot melt adhesive and backing. The pressure sensitive tape can be formed into a roll, and the tape will lay flat, however when the tape is pulled and extended from the roll edge, the curvature of the pressure sensitive tape will assist in maintaining the extended rigidity of the tape, although the tape is flexible. Further, the hot melt pressure sensitive material can be coated on a backing material that is utilized in forming panels and sheets. Here, too, the curvature imparted to the sheet or panel results in the panel or sheet being extendable and self-supporting.

In another embodiment of the invention, craters, valleys, cracks and channels formed in the composition of the tape, sheet or panel create the rigidity in the tape, panel or sheet for the tape, panel or sheet to be extendable and self-supporting. These tapes, panels and sheets can optionally include a coating. Further, the chemical structure of the materials of the tape, sheet or panel material, optionally, along with a coating material, can be altered to impart the rigidity and extendable self-supporting nature found in the tape, sheet and panel product. In one embodiment, a chemical alteration can occur which imparts the self-supporting characteristic to the material. The chemical alterations as well as the structural supports can be effected on the nanotechnology level.

In another embodiment of the invention, a shrink film layer in a laminate system induces curvature of the pressure sensitive tape, panels and sheets, which creates the rigidity for the tape, panel or sheet to be extendable and self-supporting. The shrink film in the laminate system can induce curvature of the tape, panel or sheet when the laminate system is subjected to heat during the manufacturing process or after the laminate system is already manufactured. In an alternative embodiment, the shrink film in the laminate system induces curvature of the tape, panel or sheet when a hot melt adhesive is incorporated into the laminate system during the manufacturing process and the resulting laminate system cools to activate the shrink film layer.

It should be noted that the examples provided describe the pressure sensitive tape in roll form. However, the form can include various sized pressure sensitive sheets as well as roll form. Further, the sheet or roll product can be applied by hand or by machine. The examples provided for materials in tape form are also applicable to materials in sheet or panel form, of varying widths and lengths. Also, the coatings used on the various materials, in various formats (e.g. tapes, sheets) can be a pressure sensitive adhesive coating or non-pressure sensitive or other coating.

Although specific examples have been illustrated and described herein, it will be appreciated by those of ordinary skill in the art that any arrangement calculated to achieve the same purpose could be substituted for the specific examples shown. For example, other backing materials and methods of inducing the required tape curvature could be substituted for the examples noted above and below.

BRIEF DESCRIPTION OF THE DRAWINGS

These as well as other objects and advantages of this invention will be more completely understood and appreciated by referring to the following more detailed description of the presently preferred exemplary embodiments of the invention in conjunction with the accompanying drawings, of which:

FIG. 1 depicts a roll of pressure sensitive tape that is an embodiment of the instant disclosure, wherein the curvature of the length of tape is evident;

FIG. 2 illustrates a side view of the layers of an embodiment of the tape of the disclosure;

FIG. 10 represents a table of materials that can be used in tape, sheet and panels, and certain characteristics of the materials;

Figure 3:
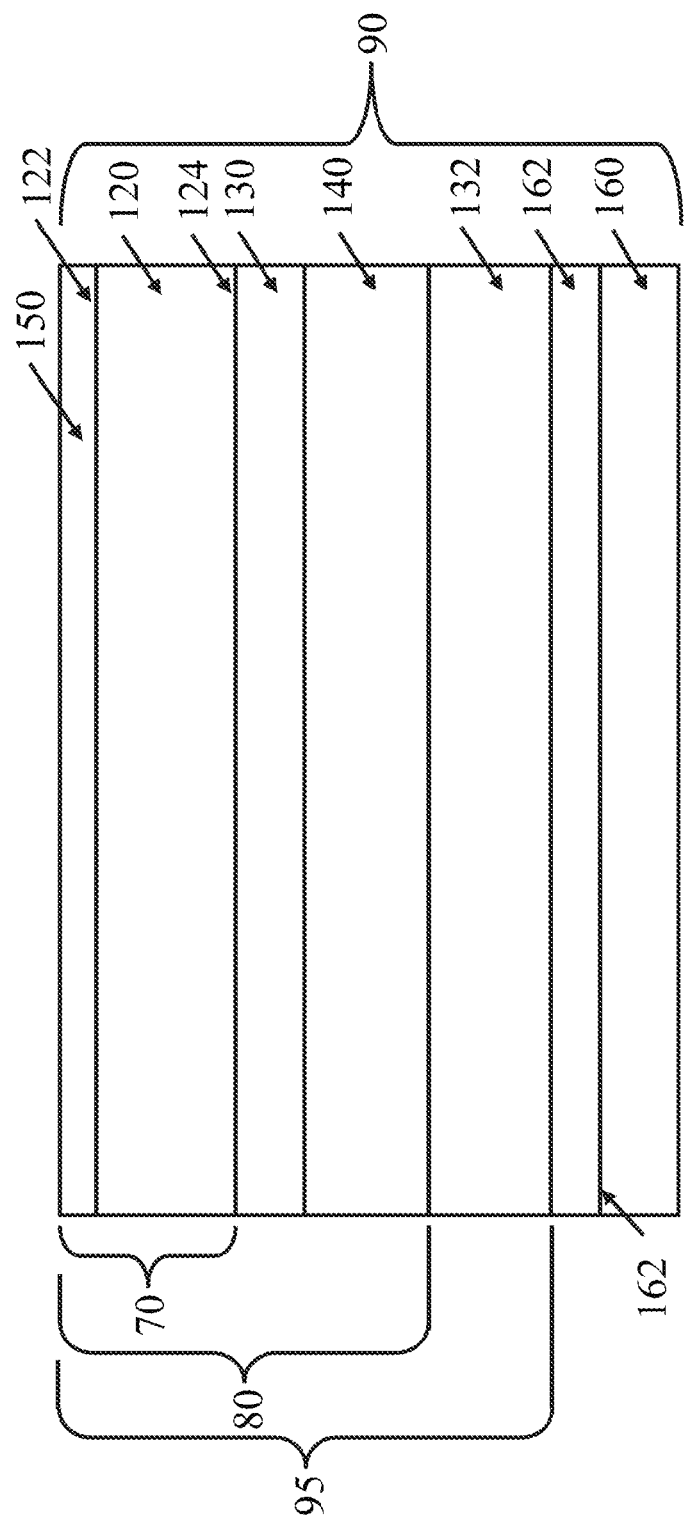
FIG. 3 illustrates the various laminates created during the process of manufacturing a tape that is an embodiment of the instant disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives.

DETAILED DESCRIPTION OF THE INVENTION

The invention is described below using an adhesive tape as an example; however other embodiments of the invention, at least as noted above, are contemplated. As illustrated in FIG. 1, the pressure sensitive tape 10 is formed on a roll and when extended from the roll, a cross section 13 of the tape length or strip 12 defines a curvature 100. The extended length 12 does not curl or coil on itself. The pressure sensitive adhesive is coated on a first surface 14 of the tape 10 and, optionally, a release coating is coated on the second surface 16 of the tape 10. A certain extendable rigidity is imparted to the tape length 12, while the tape 10 remains flexible and generally conforms to the surface to which it may be affixed.

Referring to FIG. 2 a side view of the pressure sensitive tape 10 is depicted in an embodiment of the invention, with the components comprising the tape separated into layers. Here, one layer of the tape 10 is a backing material 20, one layer is a pressure sensitive adhesive 30, one layer is a shrink film 40, and another layer is pressure sensitive adhesive 32. The pressure sensitive adhesive 30, 32 can be the same pressure sensitive adhesive or two different pressure sensitive adhesives. In addition, the backing material 20 has a release agent or coating 50 coated on a first surface 22 of the backing material 20, and the pressure sensitive adhesive is coated on a second surface 24 of the backing material 20. In this embodiment, the pressure sensitive adhesive 32 coated on the shrink film 40 is the pressure sensitive adhesive 32 that is exposed during usage and adheres to the desired surface.

Various materials can be used to manufacture the tape of the instant disclosure. For example, the backing material of the tape or sheet, dependent upon use, can be selected from materials such as paper, vinyl, polypropylene, polyethylene, polyethylene terephthalate, polycarbonate, polyester, and other such plastic films, cloth, and the like. The pressure sensitive adhesive can be in the form of a water base, solvent base, or hot melt adhesive. The choice of adhesive will take into consideration the equipment used to apply the adhesive, the materials comprising the tape or sheet, the end use for the tape or sheet, and the required performance of the adhesive, such as tack, permanence, removability, freezability, and so on. The adhesive can be altered prior to its application to the awaiting film to create the mechanism for imparting rigidity to the sheet or tape or, alternatively, the film itself can be altered prior to receiving the adhesive, for example, the film can be creped or have diagonal cuts made into the film. Various release agents or coatings can be used, such as a silicon coating, stearato chromic chloride, polysteric carbonate, and other release agents well known in the art. In the particular example provided below, a shrink film is used as part of the tape laminate to impart the desired curvature in the tape length. The material can also be used for producing a sheet or panel. The shrink film can be selected from the group comprising polypropylene, polyethylene, polyolefin, polyvinyl chloride, and other such films.

In an alternative embodiment, the pressure sensitive adhesive tape shown in FIGS. 2 and 3 does not contain a release coating 50 or 150 coated on a first surface of the backing material 20 and 120, respectively. In this alternative embodiment, the pressure sensitive adhesive 132 is chosen such that it is easily released from the backing material 20 and 120 when the pressure sensitive tape is wound into a roll configuration.

In another alternative embodiment, the pressure sensitive adhesive tape shown in FIGS. 2 and 3 contains the shrink film 40 and 140 between the release coating 50 and 150 and the backing material 20 and 120, respectively. In this alternative embodiment, the pressure sensitive adhesive 30 and 130 is located between the shrink film 40 and 140 and backing material 20 and 120, respectively, and the pressure sensitive adhesive 32 and 132 is now in direct contact with the backing material 20 and 120, respectively.

In still another alternative embodiment, the pressure sensitive adhesive tape shown in FIGS. 2 and 3 also contains a graphic, decal or wording, which may be printed on the backing material 20 and 120 or contained on another intermediate layer.

The pressure sensitive adhesive tape 10 shown in FIGS. 2 and 3 can be manufactured utilizing a system including a CLS 300 slot die-coater, a May coater and an Acumeter PG 10 melter. Other such equipment capable of coating a backing with adhesive and winding rolls of material is also contemplated. The pressure sensitive adhesive that is used to coat the substrate can be a permanent pressure sensitive adhesive or a removable pressure sensitive adhesive, and can come in various forms, such as water based adhesive, hot melt adhesive, solvent based adhesive. The instant example pressure sensitive tape was manufactured using a hot melt adhesive, producing a permanent pressure sensitive tape. The hot melt adhesive was heated to between 275° F.-325° F. in the melter. However, other temperature ranges are contemplated dependent upon the adhesive used and the backing used.

A prototype of the embodiment of FIGS. 1 through 3 was fabricated as an example. A polyester film, for example, the polyester film MYLAR®, was utilized as the backing material. As noted above, various cloth, paper, film and/or foil backings can be used. The polyester film backing 120 is coated with a release coating 150, such as a silicon release coating, on a first surface 122 of the polyester film 120. The polyester film 120 may come with the silicon coating 150 already applied to the first surface 122. The polyester film 120 in this particular example was 2 mm thick, however the polyester film 120 can range from approximately 1 mm to 10 mm, although other thicknesses outside of this range are contemplated.

Figure 4:
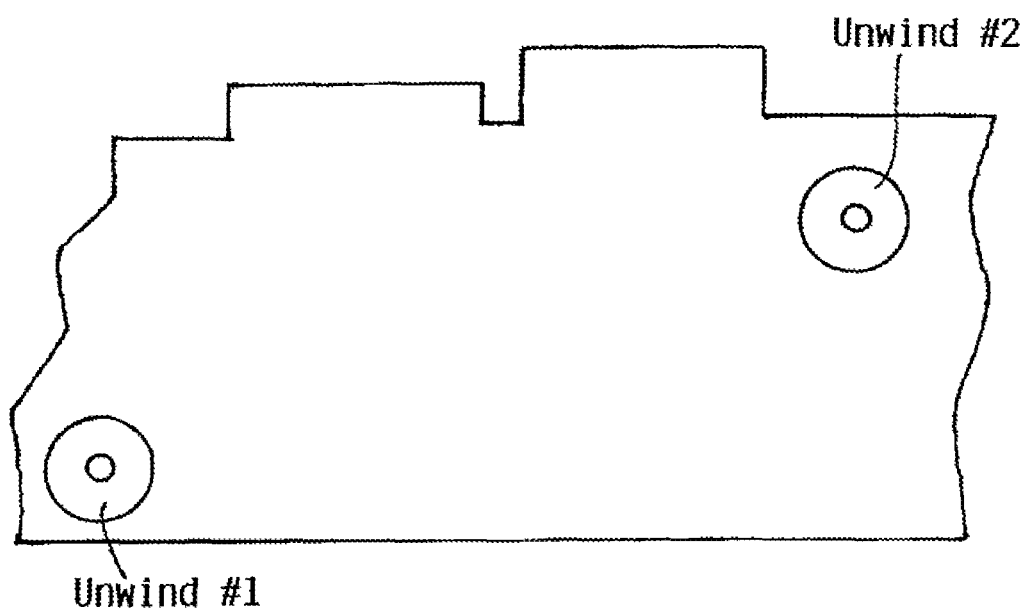
FIG. 4 illustrates an example of the manufacturing equipment.

FIG. 4 depicts the coating equipment used to manufacture the prototype. The polyester film 120 was placed on unwind #1 of the coater. The pressure sensitive hot melt adhesive was melted in the Acumeter melter and applied to a second surface 124, the non-coated surface, of the polyester film 120, at a coating speed of approximately 20-30 feet/minute. The pressure sensitive adhesive coating 130 was applied to the polyester film 120 at a thickness of approximately 1 mm.

The shrink film 140 was placed on unwind #2 and was laminated to the pressure sensitive adhesive 130 coated side of the polyester film 120 laminate 70 at the nip roller apparatus at approximately 30 psi and rewound, forming a roll wherein the layers of the laminate 80 comprise a silicon coating 150, polyester film 120, pressure sensitive adhesive 130, and shrink film 140. A silicon coated kraft paper liner 160 was mounted on unwind #1 and the silicon coated side 162 of the kraft paper liner 160 was coated with pressure sensitive adhesive 132. The pressure sensitive adhesive 132 was a hot melt adhesive, melted in the Acumeter melter, and applied to the silicon coated surface 162 of the kraft paper liner 160. The roll of laminate 80 comprising silicon coating 150, polyester film 120, pressure sensitive adhesive 130, and shrink film 140 was positioned on unwind #2 and the pressure sensitive adhesive layer 132 of the kraft paper liner 160 laminate was mated to the shrink wrap surface of the polyester film laminate 80. This new laminate 90 comprises a silicon coating 150, polyester film 120, pressure sensitive adhesive 130, shrink film 140, pressure sensitive adhesive 132, silicon coating 150, and kraft paper liner 160. The rolls of laminate 90 can be slit into the desired tape diameter.

The kraft paper liner 160 was removed, leaving behind the laminate 95 comprising a silicon coating 150, polyester film 120, pressure sensitive adhesive 130, shrink film 140, and the pressure sensitive adhesive 132. In roll or stacked sheet form, pressure-sensitive adhesive 132 is in contact with the silicon release coating 150 on the polyester film 120, and thus forms a roll of pressure-sensitive tape 10 or stack of pressure sensitive sheets. The roll or sheets can then be subjected to heat, at a temperature of approximately 300-350° F. for 5-10 seconds, thus activating the roll or sheets and imparting the desired curvature or arc 100 to the laminate 95. The cross-section 13 of the tape 10 can flatten laterally while configured in the roll of tape 10 or stacked sheets. However, for example, when a length or strip 12 of tape is pulled from the roll of tape 10, the curvature or arc 100 is present in the cross-section 13 of the length of tape 12. The curvature of the tape strip 12 cooperates with the materials of the strip of tape 12 such that the strip of tape 12 does not coil or curl on itself and extends from the edge of the roll of tape 10. In this example, the tape can extend at least 12 inches to 18 inches with greater lengths being possible.

In an alternative embodiment, the activation of the roll of tape 10 can occur in line, instead of after the roll of tape 10 is formed. The laminate 95 comprising silicon coating 150, polyester film 120, pressure sensitive adhesive 130, shrink film 140, pressure sensitive adhesive 132 can be subject to heat, such as with a heat roller, heated bar, radio frequency, pass-through oven, microwaves, gamma radiation, infrared radiation, and the like. For example, the roll of laminate tape can be placed on unwind #1 of the coater of FIG. 4, and the heat/radiation source can be placed in-line. The tape 10 passes over or through the heat source, thus inducing curvature 100 in the tape 10, and then the tape is rewound into a tape roll. The tape lays flat on the roll, but when a strip of tape 12 is pulled from the roll edge, the tape 10 rigidly extends from the tape roll a certain length without coiling or curling upon itself. Although the tape strip 12 extends rigidly from the tape roll, and is self-supporting, the tape remains flexible and able to conform to an applied surface. Although the example has been provided for producing tape, a similar process is used to produce sheets or panels of similar material that also have the property of being self-supporting, yet flexible.

Figure 5A:
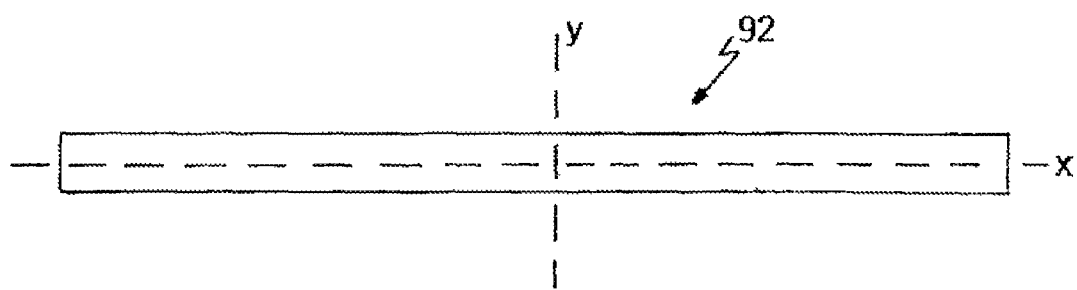
FIG. 5A illustrates a flat tape strip and FIG. 5B illustrates an arced strip of tape.
Figure 5B:
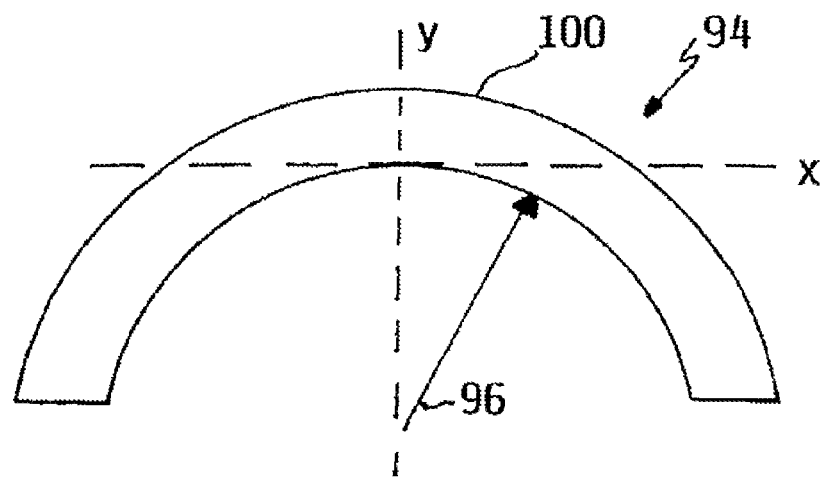

Referring to FIGS. 5A and 5B, respective cross-sections of a flat tape or sheet 92 and an arced tape or sheet 94 are depicted. Although not wanting to be bound by any particular theory, the arc shape 100 or radius 96 of the arced tape or sheet 94 possesses a certain stiffness or rigidity that is imparted to the strip of tape 12. The stiffness of the tapes or sheets 92 or 94 about an x axis or y-axis is proportional to the second moment of inertia I of the cross-section 13. In the instance of the flat tape or sheet 92, the stiffness of the tape or sheet 92 about the y axis is substantially greater than the stiffness about the x-axis; thus, the tape or sheet 92 resists deflection about the y-axis to a greater extent than about the x-axis. For the arced tape or sheet 94, the stiffness about x-axis is greater than the stiffness of the flat tape or sheet 92 about the y-axis resulting in a more rigid length. While the stiffness of the arced tape or sheet 94 about the y-axis may be diminished somewhat relative to the flat tape or sheet 92, the overall stiffness of the arced tape or sheet 94 is generally more self-supporting.

Figure 6:
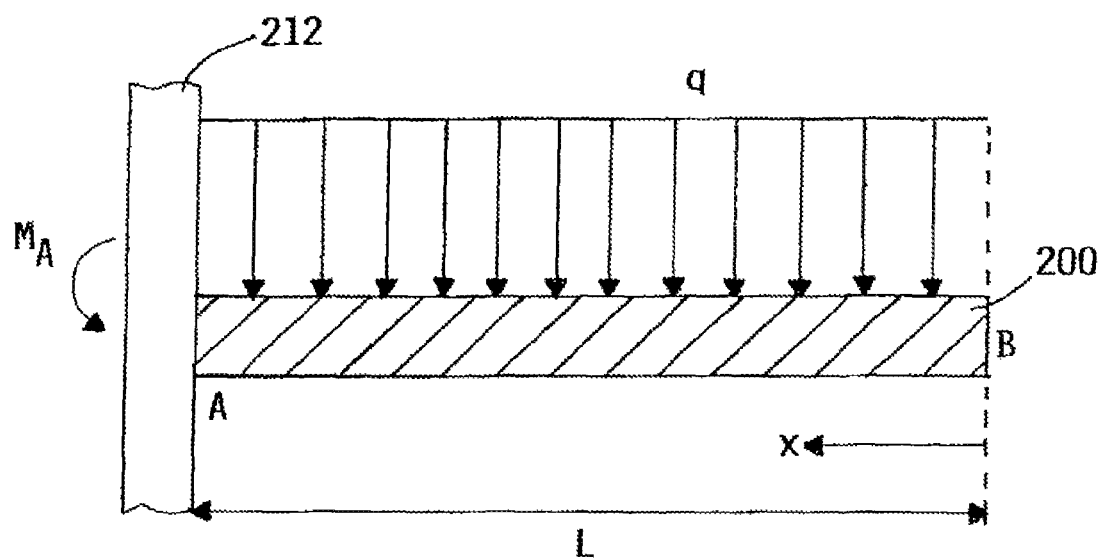
FIG. 6 illustrates a tape length under uniform pressure.
Figure 9:
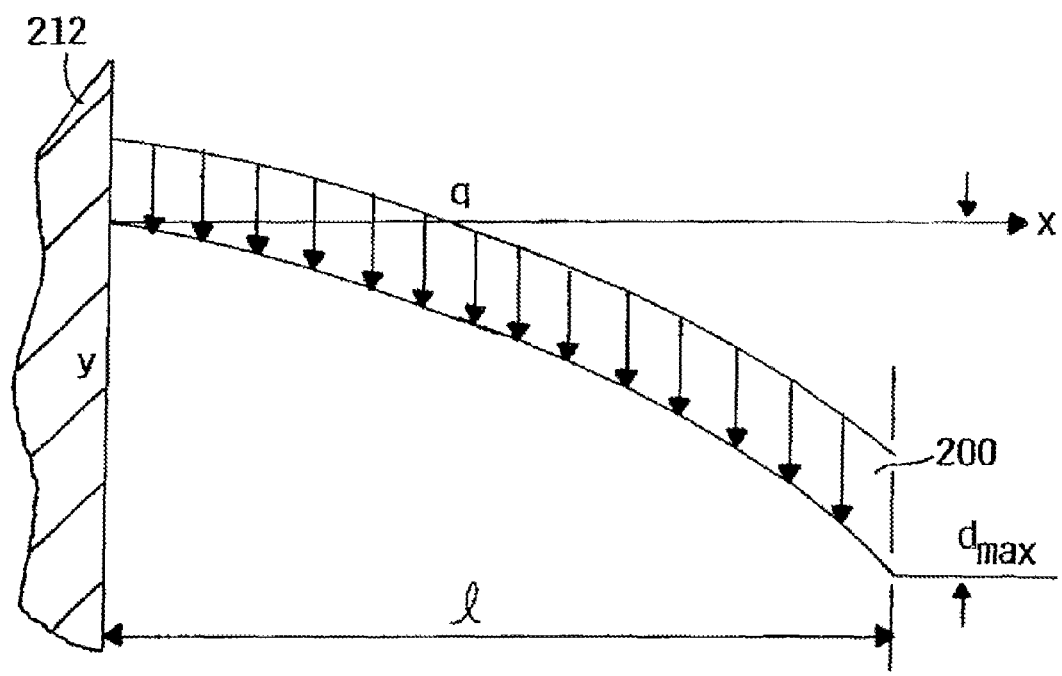
FIG. 9 illustrates a tape length bending under uniform pressure.

One embodiment of the invention is represented by tape lengths that are self-supporting and are able to extend beyond the tape roll or beyond the end of a tape applicator without additional mechanical support. A panel or sheet of material of the invention can also be configured to behave similarly, for self-support when extended. Although not wanting to be bound by any particular theory, the following is a general description of parameters affecting the self-supporting extendability of a tape or sheet of the invention. Referring to FIG. 6, the deflection of a length of tape 200 extending from the end of a tape dispenser can be approximated as a cantilever beam having a length L extending from a fixed support 212. For a cantilever beam, the shear force V is represented by the formula $V=-qx$ and the bending moment M is represented by the formula $M=-qx^2/2$, where q represents a uniformly distributed load over the length L (i.e. the weight of the tape in force per unit length) and x is any point along the axis of the length of tape 200 relative to a free end. The maximum values of the sheer force and bending moment occur at the fixed support 212 where $x=L$, $V_{max}=-qL$ and $M_{max}=-qL^2/2$. The bending moment is when a structural element, such as the tape 200 or beam, bends. The deflection at any section of the beam/tape, as shown in FIG. 9, is given by $$y=(qx^2/24EI)(x^2+6l^2-4lx),$$

and the maximum deflection is found by $\delta_{max}=ql^4/8EI$.

The Euler-Bernoulli beam theory provides a means of calculating the load-carrying and deflection characteristics of beams. The relationship between the beam's deflection and the applied load can be represented by the Euler-Bernoulli equation $$\partial^2/\partial x^2 f(EI\ \partial^2 u/\partial x^2)=w$$

The curve u(x) describes the deflection u of the beam at some position x.
w=a distributed load (force/unit length)
E=Young's modulus (modulus of elasticity; ratio of stress to strain)
I=the second moment of area or second moment of inertia.
$EI\ \partial^4 u/\partial x^4=w(x)$ describes the deflection of a uniform, static beam.
u is the deflection; $\partial u/\partial x$ is the slope of the beam; $EI\ \partial^2 u/\partial x^2$ is the bending moment of the beam; and $-\partial/\partial x\ (EI\ \partial^2 u/\partial x^2)$ is the shear force in the beam.

The bending moment and the shear force cause stresses in the beam. Shear force stresses are minimal in comparison to bending moment stresses, unless the beam is a stocky (short and thick) beam. The tensile stress of the beam can be expressed by the equation $$\sigma=Mc/I-Ec\ \partial^2 u/\partial x^2$$

c is the distance from the neutral axis to a point of interest;
c is a position along u
M=the bending moment When the tensile stress is greater than the yield stress of the material, failure in bending will occur. The equation implies that bending of positive sign will cause zero stress at the neutral axis, positive (tensile) stress is at the top of the beam and compressive stress is at the bottom of the beam; the maximum stress will be at the top surface and the minimum stress will be at the bottom surface.

In the embodiment of a length of tape being dispensed from a tape dispenser, the tape can be likened to a cantilever beam. The length of the tape can be assigned a value, L, and this is the length from the dispenser, where the dispenser x-coordinate is 0. The boundary conditions for the cantilever beam that is completely fixed at one end (deflection and slope at fixed end are both 0) and completely free at the other end (shear force and bending moment are both zero at L; assuming EI is a constant) are:
$u|_{x=0}=0\ \partial u/\partial x|_{x=0}=0$ at the fixed end; and
$\partial^2 u/\partial x^2|_{x=L}=0$ and $\partial^3 u/\partial x^3|_{x=L}=0$ at the free end.

The second moment of area or second moment of inertia is used to predict the material's resistance to bending and deflection. A high second moment of inertia in a material or beam indicates a propensity not to bend or deflect.
$I_x=\int y^2\ dA$ where
$I_x$=the second moment of inertia about the x-axis
dA=the elemental area
y=the perpendicular distance from the x-axis to the element dA.

In the example of an extension of tape, the normal stress in the tape extension due to bending is $\sigma=(M/I)y$ where
M=bending moment
I=second moment of inertia about the x-axis
Y=the perpendicular distance to the centroidal x-axis.

Figure 7:
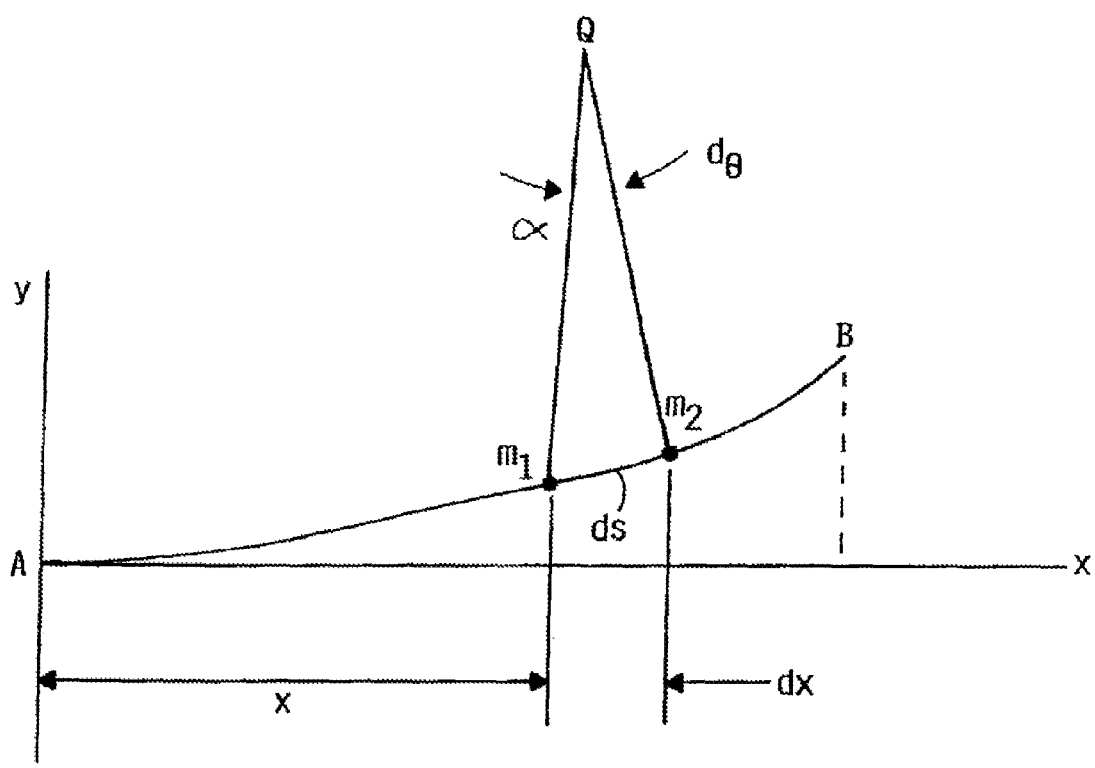
FIG. 7 illustrates the deflection of a length of tape.

A representation of the curvature of the length of tape of the example, where the tape extends from the tape dispenser is shown in FIG. 7. Here, $d\theta/ds=-\kappa=1/\rho$, where the curvature $\kappa=1$/radius of curvature. Curvature is the measure of how sharply a beam, here, the tape, is bent. As load is increased, amount of bending increases and the radius of curvature becomes smaller. The curvature can also be expressed as $\kappa=M/EI$; curvature=bending moment/flexural rigidity.

Flexural rigidity is the measure of the resistance to bending; the larger the flexural rigidity, the smaller the curvature for a given bending moment. Hence, dependent upon the various materials used for the tape, the tape's curvature and the bending moment of the tape are related such that, for a given bending moment, a small curvature ($\kappa$) is coupled with a larger flexural rigidity; and a larger curvature ($\kappa$) is coupled with a smaller flexural rigidity.

Young's modulus of elasticity (E) is a measure of the stiffness of a material, and can be represented by the ratio of stress/strain, and is measured in pascals or psi. $E=\sigma/\epsilon=F/A_0/\Delta L/L_0=F\, L_0/A_0\, \Delta L$, where;
F=force applied to the object
$A_0$=cross sectional area through which force is applied
$\Delta L$=amount by which the length of the object changes
$L_0$=original length of object Hence, the modulus of elasticity (E) of the tape, decal, or other material can be calculated, thus differentiating the various materials that can compose the tape or sheet of the invention. The tapes and sheets can comprise various combinations of backing materials, shrink materials, films, and so on, so that the E value can be tested and calculated for each combination, and ranges of values developed within which typical tapes and sheets or panels will fall. The same process can be conducted for embodiments of the invention other than tapes; for example, decal sheets or vinyl graphics panels.

Some (E) and tensile stress values for materials that can be incorporated in a tape or sheet product are noted in FIG. 10. The modulus of elasticity (E) can be determined experimentally from the slope of a stress-strain curve, created during tensile tests conducted on a sample of the material. Young's Modulus, E, allows the behavior of a material under load to be calculated; and the E value can be used to predict when a material will buckle or hinge under compression. At some point the deflection of the material (e.g. tape) will be overcome, and instead of deflecting, the material (e.g. tape) will buckle. The energy method is one method of approximating maximum buckling load, especially for non-columnar shapes. To calculate the maximum buckling load, two equations are used;
$A_{inner}=EI/2 \int(w_{xx}(x))^2\, dx$ and $A_{outer}=P_{crit}/2 \int(w_x(x))^2\, dx$; where w(x) is the displacement function and subscripts "x" and "xx" refer to the first and second derivatives of the displacement. Energy conservation results in $A_{inner}=A_{outer}$ or $EI/2 \int(w_{xx}(x))^2\, dx = P_{crit}/2 \int(w_x(x))^2\, dx$.

However, the shape of the tape length along the x-axis counteracts the tendency of the tape length to deflect, and eventually to hinge or buckle. The curvature of the tape sets-up a tension so that the tape does not deflect or buckle at the points predicted by the Euler-Bernoulli beam equations or the Timoshenko beam equations.

Figure 8:
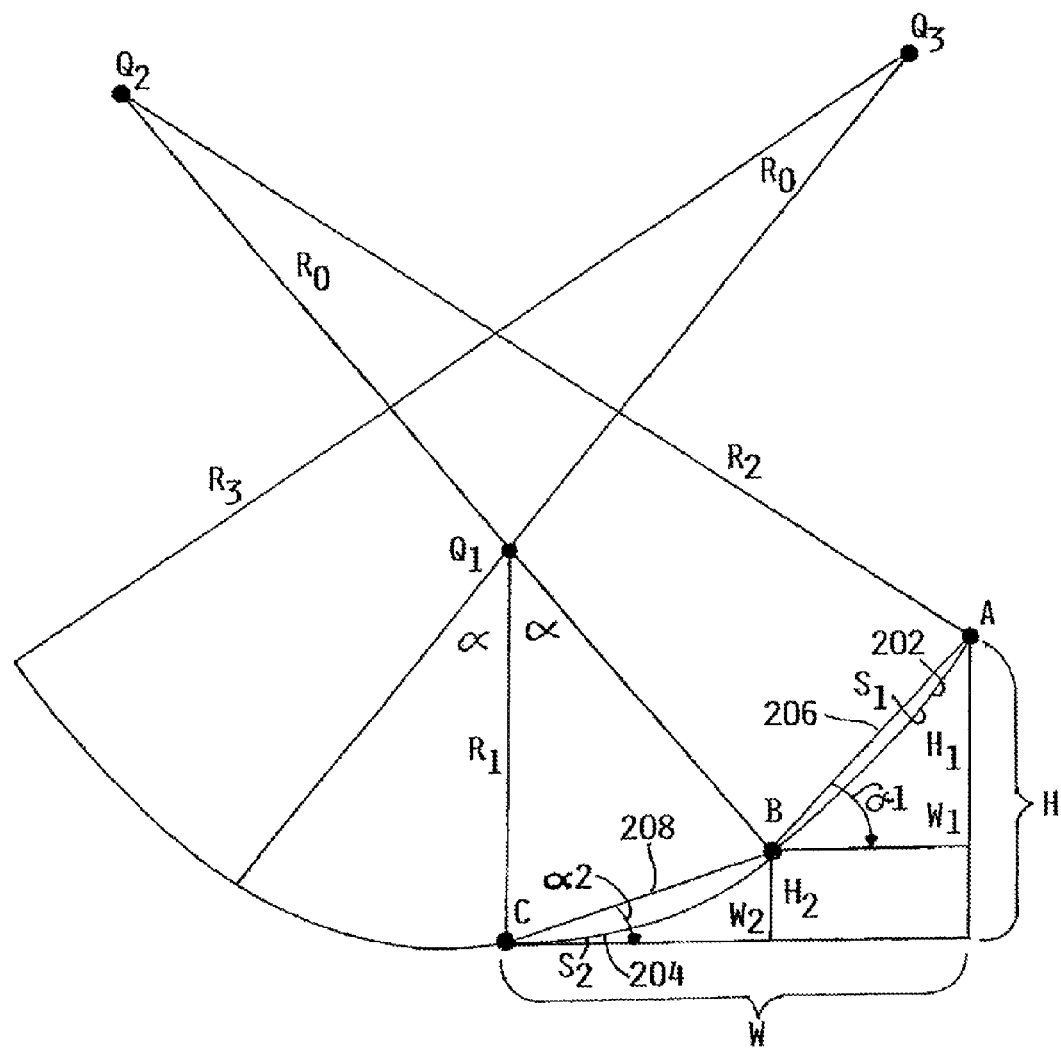
FIG. 8 illustrates longitudinal curvature of a tape or sheet.

The face of the sheet or tape along the x-axis is represented in FIG. 8, wherein the sheet or tape is curved. As a result of the curvature, that is, the convex/concave configuration, the tape, or other such structures (e.g. sheets) is capable of extending from a tape dispenser or roll for an extended length without buckling, or in the instance of tape, coiling, curling, or prematurely falling. In the instance of larger panels, for example, decals or vinyl graphic panels, the decals and panels extend in such a manner that they do not buckle at the point that panels and sheets not incorporating the instant invention generally buckle or deflect.

An optimal curvature of the concave configuration of the tape length is an important point to ensure extended self-support of the tape, decal, graphic panel, or other such material or product.

Referring to FIG. 8, the tape has two longitudinal central sections and two longitudinal side sections where the curvature of the side sections is not as great as the curvature of the central section of the tape. The tape has a slope parameter D and a length parameter L where $C=2(S_1t_1+S_2t_2)/W$ where W is the width of the tape (flattened) and $S_1$ is the arc length of the center section of the tape and $S_2$ is the arc length of the side sections of the tape; $t_1$ is the slope of the central section of the tape and $t_2$ is the slope of the side sections of the tape and H is the thickness of the tape.

As noted above, each of the side segments of the tape has a curvature that is less than the curvature of the central segment of the tape. Hence, the tape forms a concave structure; a trough-like shape. This concave structure of the tape, along with the tape materials, is instrumental in maintaining the extendable self-supporting configuration of the tape. The radius of the central segment curvature is designated $R_1$, with a radius angle $2\alpha$; and the radius of each side segment curvature is designated $R_2$, with a radius angle $\beta$. If the radii $R_1$ of the central segment are extended, they intersect at point $Q_1$, the center of a circle with radii $R_1$. Similarly, if the radii $R_2$ of a first side segment are extended, they intersect at a point $Q_2$, the center of a circle with radius $R_2$. The circle formed by the radii $R_3$ of a second side segment form a circle with a radius of $R_2$, and a center of $Q_3$, as shown in FIG. 8.

The two radii $R_2$ associated with the first side segment define an arc AB (202), with a length of $S_1$. The radii R1 associated with the central segment, and a projecting angle $\alpha$ define an arc BC (204) with a length of $S_2$. Further, the width from A to B is defined as $W_1$ and the width from B to C is defined as $W_2$. The height from A to B is defined as $H_1$ and the height from B to C is defined as $H_2$. The total width of the tape is defined as W. A chord 206 connecting points A and B is shown in FIG. 8 and defined as $t_1$ (the tangent), where $t_1=H_1/W_1=\tan\gamma_1$. Further, a chord 208 connecting points B and C is shown in FIG. 8 and is defined as $t_2$, where $t_2=H_2/W_2=\tan\gamma_1$. Therefore, the arc length from A to B can be expressed as $S_1=R_2\beta$; and the arc length from B to C is expressed as $S_2=R_1\alpha$. Further, the width of the tape can be expressed as $2(S_1+S_2)$. The slope of the line AC can be expressed as $D=2(S_1t_1+S_2t_2)/W$.

Examples of the self-supporting tape or sheet are measured to determine the various parameters as described above. Based upon these measurements, the ratio of the slope of line AC (value D) is determined. The ratio of L/D, where L is the length of tape that is self-supporting for that particular D value is calculated for each sample. The length L is correlated to the value of the slope D, so that the ratio of L/D, at various values of D is predictive of the self-supporting length L. In the above samples, the value of the thickness of the tape is held constant. However, in additional examples, the thickness of the tape can be varied, to determine the effect of the thickness of the tape on the self-extending length L. Further, the ration of W/D can be calculated to determine the width parameter of the self-supporting tape.

The transverse curvature of the tape or sheet increases the second moment of inertia, improving the bending performance of the tape or sheet. The transverse curvature of the tape or sheet also imparts hinge-like behavior to the tape length or sheet. When a bending moment M is applied to the end of, for example, the tape, the tape exhibits elastic deformation, and when the bending moment M is removed, the tape returns generally to its original configuration. Once a critical load on the tape end is reached, the tape behaves like an elastic hinge, and buckles. A constant force is required if the deformation is to be increased. The materials composing the tape or sheet, and the degree of transverse curvature of the tape or sheet, affect the magnitude of the load needed to induce the hinge-like effect in the tape or sheet. This effect can by described by the equations $$r=\sqrt{(D^*_{11}/D^*_{22})}R \text{ and } M_y=D_{22}/R$$

Figure 11A:
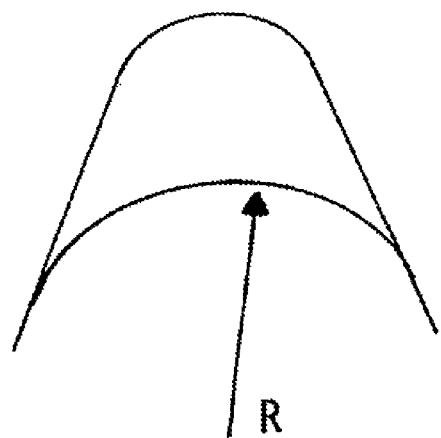
FIG. 11A illustrates the undeformed transverse curvature of a length of material of the invention and FIG. 11B illustrates the deformed longitudinal curvature (hinge/hinging) of material of the invention.
Figure 11B:
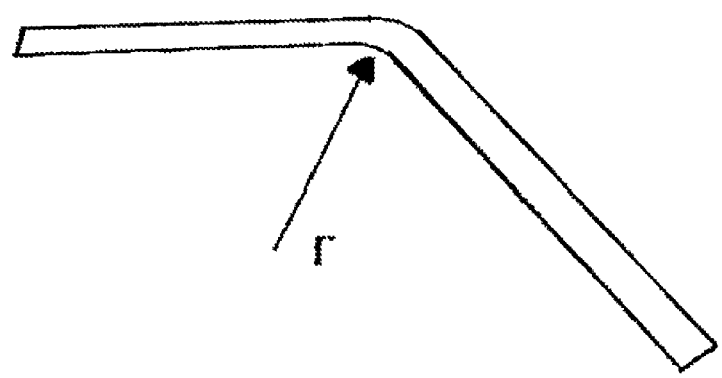
Figure 12:
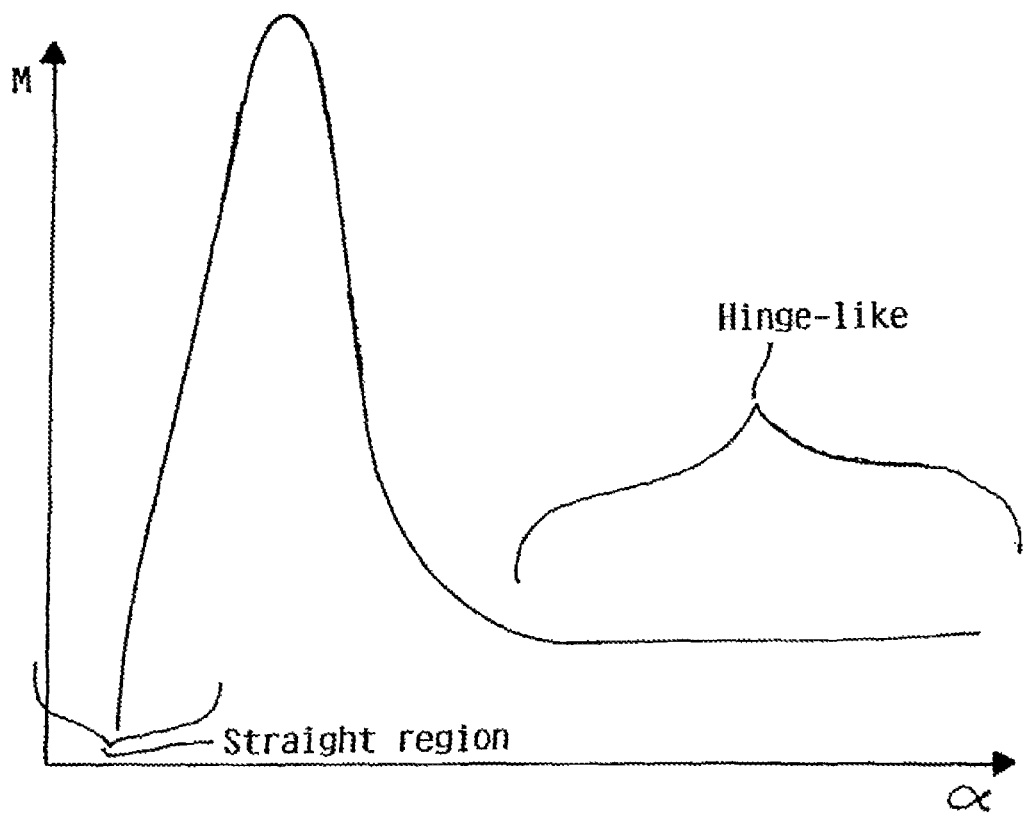
FIG. 12 is a chart illustrating bending moment effect on the straight region and hinge-like region of material of the invention.

$D^*_{ii}$ represents the components of the reduced flexural matrix of the laminate, R and r are the undeformed transverse curvature and the deformed longitudinal curvature of the tape or sheet, as shown in FIG. 11. The value $D_{22}$ is a component of the flexural matrix and $M_y$ is the moment that has to be applied to a flat sheet to produce the curvature $\kappa_y=1/R$. A chart in FIG. 12 shows, diagrammatically, the effect of applying bending moments at the end of the tape.

Figure 13A:
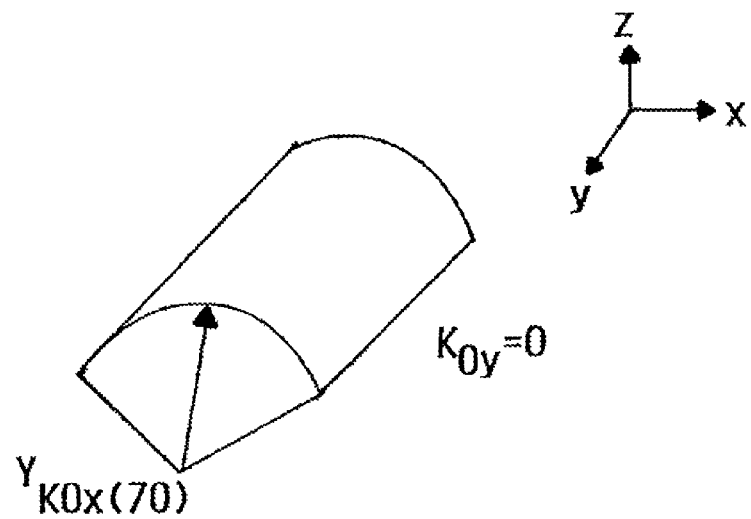
FIG. 13A illustrates an arced sheet material of the invention and FIG. 13B illustrates edge bending moments resulting in a substantially flattened sheet material of the invention.
Figure 13B:
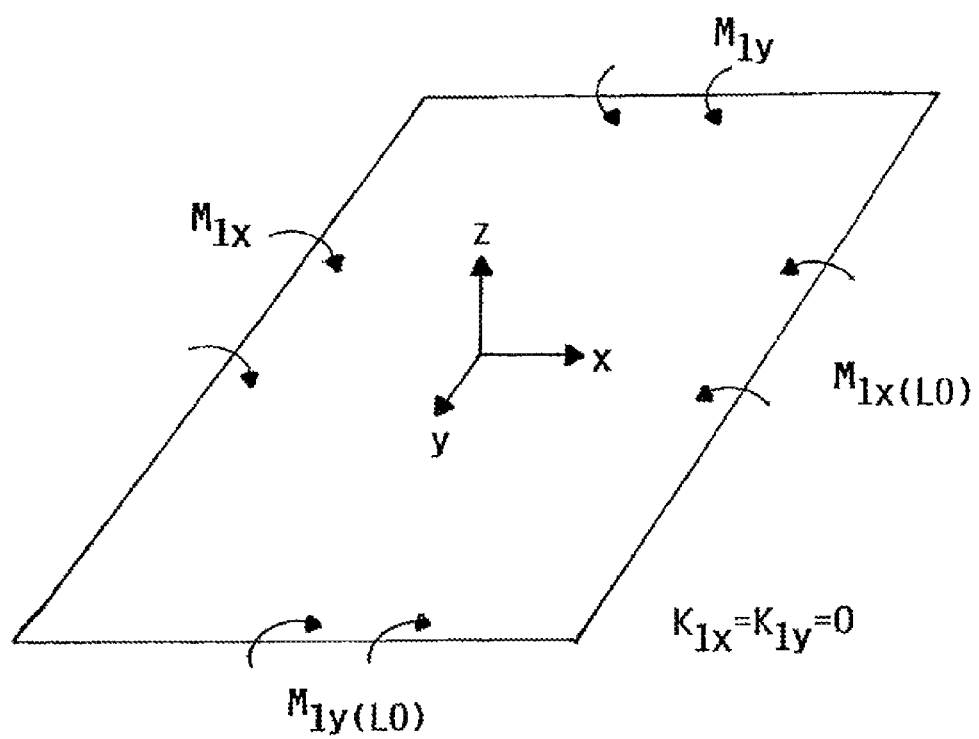

Referring to FIG. 13, generally, likely, the tape or sheet flattens prior to buckling, creating the hinge in the tape or sheet. The tape or sheet is flattened by applying edge bending moments per unit length $M_{1x}$ and $M_{1y}$, such that $k_{1x}=k_{1y}=0$. The stress $\sigma_{1x}$ in the tape or sheet is a result of the imposed change of curvature in the x direction and the stress $\sigma_{1y}$ is due to Poisson's ratio effects.

$$\sigma_{1y}=-(\nu E/1-\nu^2)zk_{0x} \quad \sigma_{1x}=-(E/1-\nu^2)zk_{0x}$$

z is the distance from the mid-surface of the tape or sheet; E is Young's modulus and ν the Poisson's ratio of the material.

The tape or sheet elastically flattens when the cross-section cannot support the load on the tape or sheet. A thicker tape or sheet, or a smaller radius (i.e. deeper trough in the curvature) can increase the second moment of inertia, working to improve self-supporting extendability by improving bending performance.

The hinge effect as it relates to the sweep angle of airplane wings is discussed in *The application of residual stress tailoring of snap-through composites for variable sweep wings* by Mattioni et al. in 47th AIAA/ASME/ASCE/AHS/ASC Structures, Structural Dynamics, and Materials Conference 1-4 May 2006, Newport, R.I. and the "snap-bracelet" configuration of a coil wherein the transverse curvature in the extended configuration and longitudinal in the coiled configuration have equal signs is discussed in *Bistable prestressed shell structures* by Kebadze et al in the International Journal of Solids and Structures 41 (2004) 2801-2820, and both references are herein incorporated by reference.

The above described analysis is extended to self-sustaining sheets and panels, wherein the value of the length and width of the self-supporting sheet or panel can be determined using the above methodology.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents.

We claim:

1. A pressure sensitive tape comprising: a laminated material having an axial length and a longitudinal width;
    the laminated material having a substrate material layer having a first surface and a second surface, a first adhesive layer, a heat activated shrink film layer having a first surface and a second surface, and a second adhesive layer,
    wherein the first adhesive layer is disposed between the second surface of the substrate material layer and the first surface of the shrink film layer, and the second adhesive layer is disposed on the first surface of the substrate material layer or the second surface of the shrink film layer, and wherein the second adhesive layer comprises a pressure sensitive adhesive; and
    the axial length of the laminated material has a curvature about the longitudinal width of the laminated material induced by heat activation of the shrink film layer, wherein the curvature is in the shape of an arc; and
    wherein the laminated material when extended is self-supporting, and
    wherein the substrate material is not a shrink film, and the substrate material and the activated shrink film cooperate to impart the curvature which imparts stiffness to the laminated material.

2. The pressure sensitive tape of claim 1, wherein the axial length of the laminated material, perpendicular to the longitudinal width, is wound in a roll and wherein, when a first extendable portion of the laminated material is unwound from the roll, the axial length of the laminated material wound and stored in the roll has a laterally flattened configuration and the first extendable portion has the longitudinal curvature about the longitudinal width when unwound.

3. The pressure sensitive tape of claim 1, wherein the substrate material layer comprises a material selected from the group consisting of paper, vinyl, polypropylene, polyethylene, polyethylene terephthalate, polycarbonate, a plastic film, cloth, polyester, and cellulose nanofibrils.

4. The pressure sensitive tape of claim 1, wherein the first adhesive layer comprises an adhesive selected from the group consisting of a water base adhesive, a solvent base adhesive, and a hot melt adhesive.

5. An extendable self-supporting material comprising:
    a laminated material having an axial length and a longitudinal width, the laminated material comprising:
    a substrate material having a first surface and a second surface;
    a heat activated shrink film having a first surface and a second surface, the first surface of the shrink film laminated to the second surface of the substrate material; and
    wherein the axial length of the laminated material has curvature in the shape of an arc about the longitudinal width induced by heat activation of the shrink film; and
    wherein the curvature causes resistance to bending of the laminated material along the axial length when the self-supporting material is extended, and
    wherein the substrate material is not a shrink film, and the substrate material and the activated shrink film cooperate to impart the curvature which imparts stiffness to the laminated material.

6. A self-supporting material comprising:
a laminated material having an axial length and a longitudinal width, the laminated material comprising:
a.) a substrate material having a first surface and a second surface,
b.) a heat activated shrink film having a first surface and a second surface, the first surface of the shrink film laminated to the second surface of the substrate material, and the axial length of the laminated material has curvature about the longitudinal width, induced by heat activation of the shrink film, that causes resistance to bending of the laminated material along the axial length of the laminated material, wherein the curvature is in the shape of an arc;
wherein the laminated material is self-supporting, and
wherein the substrate material is not a shrink film, and the substrate material and the activated shrink film cooperate to impart the curvature which imparts stiffness to the laminated material.

7. The self-supporting material of claim 5, wherein the axial length of the self-supporting material, perpendicular to the longitudinal width, is wound in a roll and wherein, when a first extendable portion of the self-supporting material is unwound from the roll, the axial length of the self-supporting material wound and stored in the roll has a laterally flattened configuration and the first extendable portion has a longitudinal curvature about the longitudinal width when unwound.

8. The self-supporting material of claim 5, wherein the substrate material comprises a material selected from the group consisting of paper, vinyl, polypropylene, polyethylene, polyethylene terephthalate, polycarbonate, a plastic film, cloth, cellulose nanofibrils, cellophane, and polyester.

9. The self-supporting material of claim 6, wherein the substrate material comprises a material selected from the group consisting of paper, vinyl, polypropylene, polyethylene, polyethylene terephthalate, polycarbonate, a plastic film, cloth, cellulose nanofibrils, cellophane, and polyester.

10. The self-supporting material of claim 5, further comprising a pressure sensitive adhesive disposed on the first surface of the substrate material or the second surface of the shrink film.

11. A self-supporting material consisting essentially of:
a laminated material having an axial length and a longitudinal width, the laminated material consisting essentially of:
a.) a substrate material having a first surface and a second surface,
b.) a heat activated shrink film having a first surface and a second surface, the first surface of the shrink film laminated to the second surface of the substrate material, and;
c.) a pressure sensitive adhesive disposed on the first surface of the substrate material or second surface of the shrink film;
the axial length of the laminated material having curvature in the shape of an arc about the longitudinal width that causes resistance to bending of the laminated material along the axial length of the laminated material, the curvature induced by heat activation of the shrink film; and
wherein the laminated material when extended is self-supporting, and
wherein the substrate material is not a shrink film, and the substrate material and the activated shrink film cooperate to impart the curvature which imparts stiffness to the laminated material.

12. The pressure sensitive tape of claim 1, wherein the tape can extend at least 12 inches from the edge of a roll of the tape.

13. The self-supporting material of claim 5, wherein the material can extend at least 12 inches from the edge of a roll of the material.

14. The self-supporting material of claim 6, wherein the material can extend at least 12 inches from the edge of a roll of the material.

15. The self-supporting material of claim 11, wherein the material can extend at least 12 inches from the edge of a roll of the material.

16. The self-supporting material of claim 6, further comprising an adhesive disposed between the first surface of the shrink film and the second surface of the substrate material.

17. The pressure sensitive tape of claim 1, wherein the first layer comprises a pressure sensitive adhesive with permanence.

18. The self-supporting material of claim 5, further comprising an adhesive disposed between the first surface of the shrink film and the second surface of the substrate material.

19. The self-supporting material of claim 18, wherein the adhesive disposed between the first surface of the shrink film and the second surface of the substrate material comprises a pressure sensitive adhesive that exhibits permanence.

20. The self-supporting material of claim 16, wherein the adhesive comprises a pressure sensitive adhesive that exhibits permanence.

21. The self-supporting material of claim 11, further comprising an adhesive disposed between the first surface of the shrink film and the second surface of the substrate material.

22. The pressure sensitive tape of claim 1, wherein the heat activated shrink film layer has been activated by exposure to a heat source selected from the group consisting of a heat roller, a heated bar, and a pass-through-oven.

23. The extendable self-supporting material of claim 5, wherein the heat activated shrink film has been activated by exposure to a heat source selected from the group consisting of a heat roller, a heated bar, and a pass-through-oven.

24. The self-supporting material of claim 6, wherein the heat activated shrink film has been activated by exposure to a heat source selected from the group consisting of a heat roller, a heated bar, and a pass-through-oven.

25. The self-supporting material of claim 11, wherein the heat activated shrink film has been activated by exposure to a heat source selected from the group consisting of a heat roller, a heated bar, and a pass-through-oven.

26. The pressure sensitive tape of claim 1, wherein the heat activated shrink film layer has been activated by exposure to a heat source selected from the group consisting of radio frequency, microwaves, gamma radiation, and infrared radiation.

27. The extendable self-supporting material of claim 5, wherein the heat activated shrink film has been activated by exposure to a heat source selected from the group consisting of a radio frequency, microwaves, gamma radiation, and infrared radiation.

28. The self-supporting material of claim 6, wherein the heat activated shrink film has been activated by exposure to a heat source selected from the group consisting of a radio frequency, microwaves, gamma radiation, and infrared radiation.

29. The self-supporting material of claim 11, wherein the heat activated shrink film has been activated by exposure to a heat source selected from the group consisting of a radio frequency, microwaves, gamma radiation, and infrared radiation.

* * * * *